United States Patent
Oh et al.

(10) Patent No.: US 10,079,105 B2
(45) Date of Patent: Sep. 18, 2018

(54) MULTI-LAYER CERAMIC CAPACITOR ASSEMBLY

(71) Applicant: SAMHWA CAPACITOR CO., LTD., Yongin-si (KR)

(72) Inventors: Young Joo Oh, Seoul (KR); Jung Rag Yoon, Yongin-si (KR); Young Min Yoo, Gwonseon-gu (KR)

(73) Assignee: SAMHWA CAPACITOR CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/399,029

(22) Filed: Jan. 5, 2017

(65) Prior Publication Data

US 2018/0190434 A1 Jul. 5, 2018

(51) Int. Cl.
| | |
|---|---|
| *H01G 4/228* | (2006.01) |
| *H01G 2/06* | (2006.01) |
| *H01G 4/30* | (2006.01) |
| *H01G 4/008* | (2006.01) |
| *H01G 4/12* | (2006.01) |
| *H01G 4/012* | (2006.01) |
| *H01G 4/242* | (2006.01) |
| *H01G 4/258* | (2006.01) |

(52) U.S. Cl.
CPC ............ *H01G 4/30* (2013.01); *H01G 4/0085* (2013.01); *H01G 4/012* (2013.01); *H01G 4/12* (2013.01); *H01G 4/242* (2013.01); *H01G 4/258* (2013.01)

(58) Field of Classification Search
None
See application file for complete search history.

(56) References Cited

U.S. PATENT DOCUMENTS

| | | | |
|---|---|---|---|
| 5,335,139 A | 8/1994 | Nomura et al. | |
| 2015/0114697 A1* | 4/2015 | Murrell | H01G 4/232 174/255 |

FOREIGN PATENT DOCUMENTS

| | | | |
|---|---|---|---|
| JP | 11273984 A | * | 10/1999 |
| KR | 100992674 | | 11/2010 |

* cited by examiner

*Primary Examiner* — Eric Thomas
(74) *Attorney, Agent, or Firm* — Cantor Colburn LLP

(57) ABSTRACT

A multi-layer ceramic capacitor assembly includes a first terminal assembly member formed by arranging first protruded members at specific intervals, a second terminal assembly member formed by arranging second protruded members at specific intervals so that they face the respective first protruded members, insulated heat dissipation members supported by the first protruded members and the second protruded members and disposed therein, and multi-layer ceramic capacitors alternately disposed between the insulated heat dissipation members so that each multi-layer ceramic capacitor comes into contact with one side and the other side of each insulated heat dissipation member in a first direction, the end on one side of the multi-layer ceramic capacitor in a second direction orthogonal to the first direction is connected to the first terminal assembly member, and the end on the other side of the multi-layer ceramic capacitor in the second direction is connected to the second terminal assembly member.

3 Claims, 7 Drawing Sheets

MULTI-LAYER CERAMIC CAPACITOR ASSEMBLY

BACKGROUND OF THE INVENTION

1. Technical Field

The present invention relates to a multi-layer ceramic capacitor assembly and, more particularly, to a multi-layer ceramic capacitor assembly, which can reduce a size using multi-layer ceramic capacitors having an excellent temperature characteristic and capacity per unit volume and can have an excellent heat dissipation characteristic by alternately inserting heat dissipation members between a plurality of the multi-layer ceramic capacitors when the multi-layer ceramic capacitors are assembled into a single assembly.

2. Description of the Related Art

A direct current (DC)-link capacitor assembly is used in an electric vehicle, a hybrid vehicle (e.g., a vehicle to which an electric driving source is applied), a hydrogen fuel vehicle and a power transmission system. A technology regarding the DC-link capacitor assembly applied to such various fields has been disclosed in Korean Patent No. 0992674 (Patent Document 1).

Korean Patent No. 0992674 relates to the DC input stage film capacitor of an inverter for securing cooling performance. The DC input stage film capacitor includes a film capacitor unit assembly, a film capacitor casing, a bus bar for a positive (+) film capacitor, a bus bar for a negative (−) film capacitor, a bus bar for positive (+) high voltage input and a bus bar for negative (−) high voltage input.

In Korean Patent No. 0992674, the bus bars for positive (+) and negative (−) high voltage input do not have direct contact with the film capacitor unit assembly, but are connected to an insulated gate bipolar mode transistor (IGBT) power assembly. A first path, a second path, a third path and a fourth path are formed in the film capacitor casing. The first path and the second path are formed between the internal spaces of the film capacitor casing, and the third path is formed between the internal space of the film capacitor casing and the external wall of the film capacitor casing in the direction of the DC input stage of the inverter. The fourth path is formed between the internal space of the film capacitor casing and the external wall of the film capacitor casing on the IGBT power assembly side. The bus bars for positive (+) and negative (−) high voltage input are inserted through the first path, the second path, the third path and the fourth path formed in the film capacitor casing and fixed, thus connecting the DC input stage through which a DC current flows and the IGBT power assembly to the inverter.

A conventional DC-link capacitor assembly, such as that of Korean Patent No. 0992674, has an excellent temperature characteristic because it uses the film capacitor, but is problematic in that volume is increased because a capacity per unit volume is low.

PRIOR ART DOCUMENT

[Patent Document]
(Patent Document 1) Patent Document 1: Korean Patent No. 0992674 (Nov. 1, 2010)

SUMMARY OF THE INVENTION

An object of the present invention is to provide a multi-layer ceramic capacitor assembly, which can reduce a size using multi-layer ceramic capacitors having an excellent temperature characteristic and capacity per unit volume and can have an excellent heat dissipation characteristic by alternately inserting heat dissipation members between a plurality of the multi-layer ceramic capacitors when the multi-layer ceramic capacitors are assembled into a single assembly.

Another object of the present invention is to provide a multi-layer ceramic capacitor assembly having an excellent heat dissipation characteristic by inserting a heat dissipation member between the multi-layer ceramic capacitor assembly and a casing when the multi-layer ceramic capacitor assembly and the casing are assembled.

A multi-layer ceramic capacitor assembly according to an embodiment of the present invention includes a first terminal assembly member formed by arranging a plurality of first protruded members at specific intervals, a second terminal assembly member formed by arranging a plurality of second protruded members at specific intervals in such a way as to face the respective first protruded members, a plurality of insulated heat dissipation members supported by the first protruded members and the second protruded members and disposed therein, respectively, and a plurality of multi-layer ceramic capacitors alternately disposed between the plurality of insulated heat dissipation members so that each of the multi-layer ceramic capacitors comes into contact with one side and the other side of each of the insulated heat dissipation members in a first direction, the end on one side of the multi-layer ceramic capacitor in a second direction orthogonal to the first direction is connected to the first terminal assembly member, and the end on the other side of the multi-layer ceramic capacitor in the second direction is connected to the second terminal assembly member.

DETAILED DESCRIPTION

Hereinafter, multi-layer ceramic capacitor assemblys according to embodiments of the present invention are described with reference to the accompanying drawings.

Figure 1:
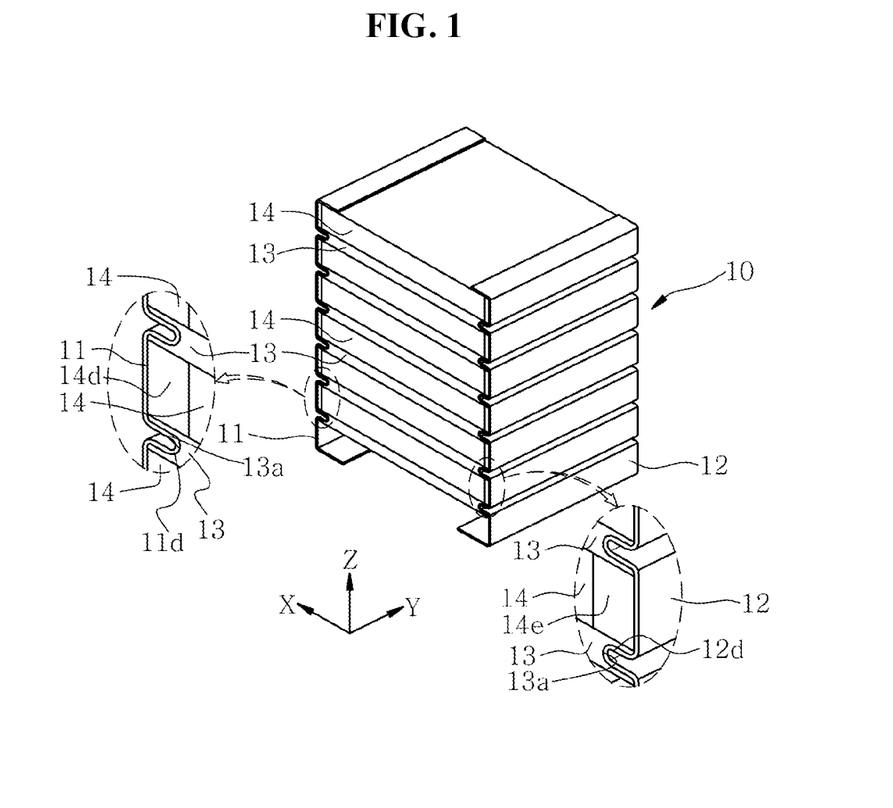
FIG. 1 is a perspective view of a multi-layer ceramic capacitor assembly according to an embodiment of the present invention.
Figure 2:
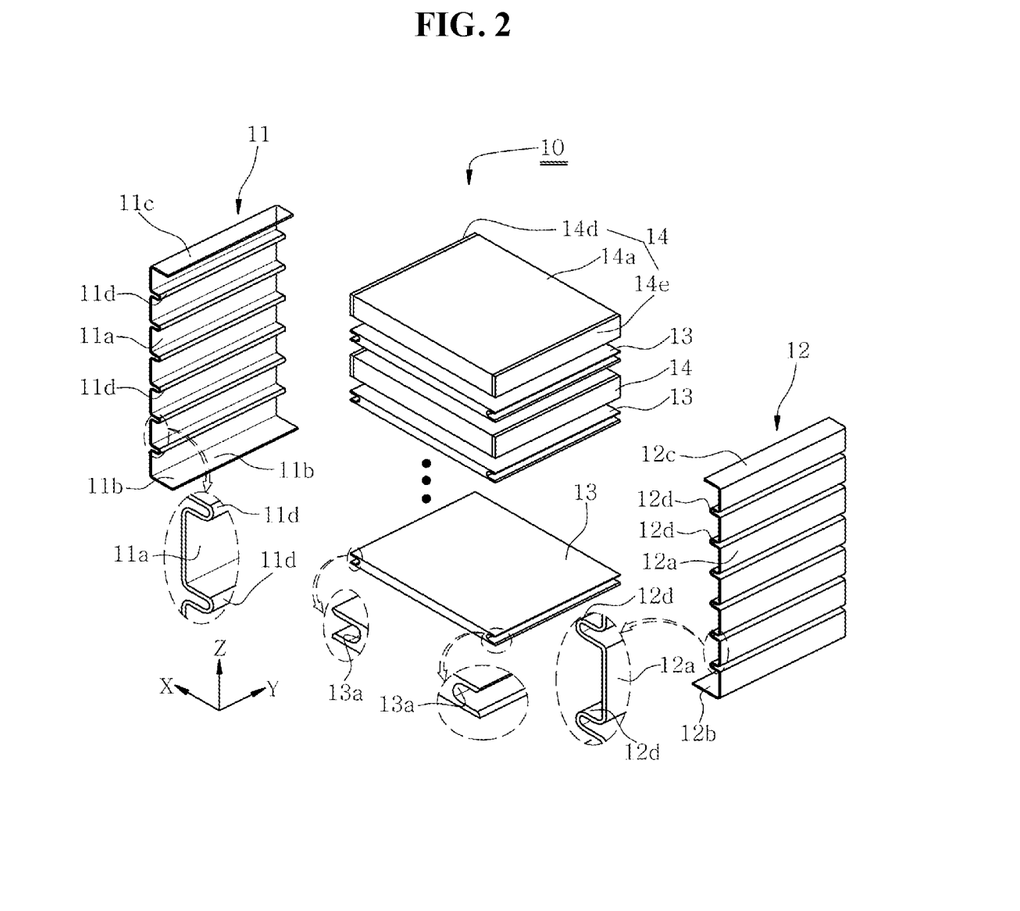
FIG. 2 is an exploded perspective view of the multi-layer ceramic capacitor assembly shown in FIG. 1.

As shown in FIGS. 1 and 2, a multi-layer ceramic capacitor assembly 10 according to an embodiment of the present invention includes a first terminal assembly member 11, a second terminal assembly member 12, a plurality of insulated heat dissipation members 13 and a plurality of multi-layer ceramic capacitors 14.

The first terminal assembly member 11 is formed by arranging a plurality of first protruded members 11d at specific intervals. The second terminal assembly member 12 is formed by arranging a plurality of second protruded members 12d at specific intervals so that the second protruded members 12d face the respective first protruded members 11d. The plurality of insulated heat dissipation members 13 is supported by the first protruded members 11d and the second protruded members 12d and disposed therein, respectively. The plurality of multi-layer ceramic capacitors 14 is alternately disposed between the plurality of insulated heat dissipation members 13 so that each of the multi-layer ceramic capacitors 14 comes into contact with one side and the other side of each of the insulated heat dissipation members 13 in a first direction Z. The end on one side of the multi-layer ceramic capacitor 14 in a second direction X orthogonal to the first direction Z is connected to the first terminal assembly member 11, and the end on the other side of the multi-layer ceramic capacitor 14 in the second direction X is connected to the second terminal assembly member 12. In this case, the first direction Z is indicative of the thickness direction of the multi-layer ceramic capacitor 14.

The configuration of the multi-layer ceramic capacitor assembly 10 according to an embodiment of the present invention is described in more detail below.

As shown in FIG. 2, the first terminal assembly member 11 and the second terminal assembly member 12 include vertical plates 11a and 12a, lower plates 11b and 12b and upper plates 11c and 12c, respectively.

The plurality of first protruded members 11d (or the plurality of second protruded members 12d) is spaced apart from each other at a specific interval to form the vertical plate 11a (or 12a) in the first direction Z. For example, the plurality of first protruded members 11d and the plurality of second protruded members 12d are formed in the vertical plates 11a and 12a, respectively, so that they correspond to each other and are placed at the same height. That is, the plurality of first protruded members 11d (or the plurality of second protruded members 12d) is formed by bending the vertical plate 11a (or 12a) at specific intervals so that the vertical plate 11a (or 12a) is partially protruded in the second direction X. The lower plate 11b (or 12b) is extended from the end on one side of the vertical plate 11a (or 12a) in the second direction X orthogonal to the first direction Z. The upper plate 11c (or 12c) is extended from the end on the other side of the vertical plate 11a (or 12a) in the same direction as the lower plate 11b (or 12b). The vertical plates 11a and 12a, the lower plates 11b and 12b and the upper plates 11c and 12c are made of a metal material, and they electrically connect the plurality of multi-layer ceramic capacitors 14 and enable heat generated from the plurality of multi-layer ceramic capacitors 14 to be transferred through the insulated heat dissipation members 13.

Figure 3:
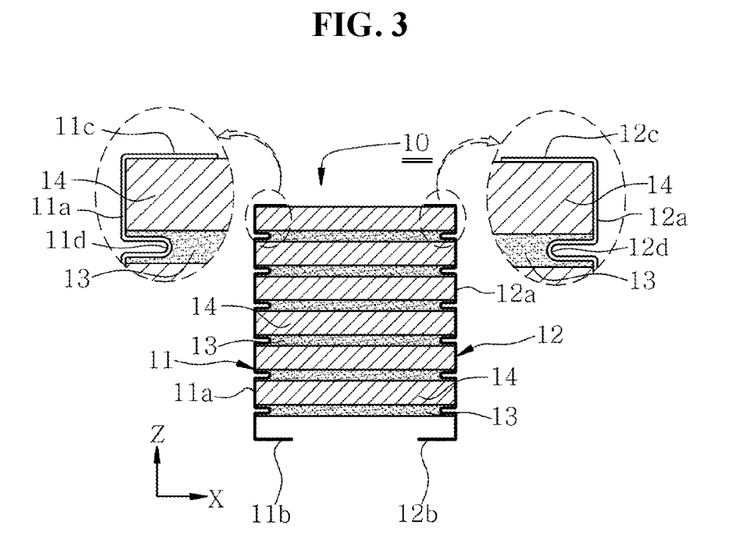
FIG. 3 is a cross-sectional view of the multi-layer ceramic capacitor assembly shown in FIG. 1.
Figure 4:
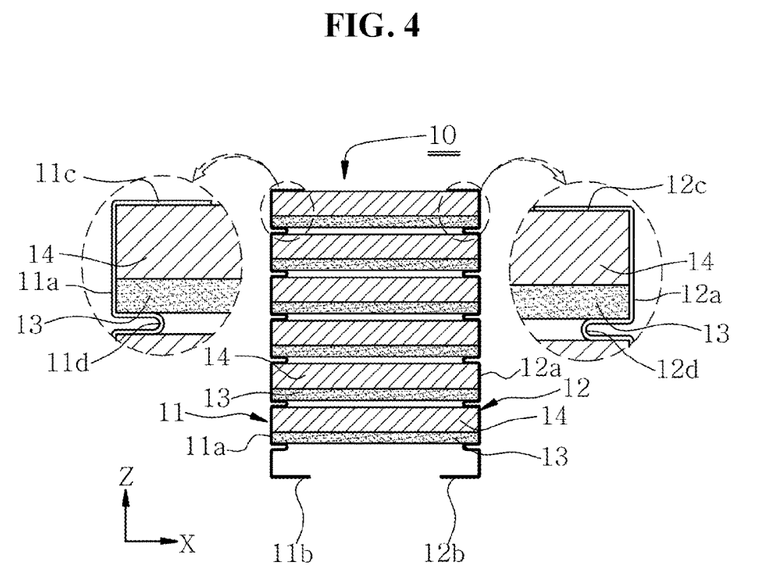
FIG. 4 is a cross-sectional view showing another embodiment of the multi-layer ceramic capacitor assembly shown in FIG. 1.

Each of the plurality of insulated heat dissipation members 13 is formed of a ceramic plate. As shown in FIG. 4, the ends on one side and the other side of each insulated heat dissipation member 13 in the second direction X are flat. Alternatively, as shown in FIG. 3, a groove 13a is formed in each insulated heat dissipation member 13, supported and coupled to the first protruded member 11d and the second protruded member 12d, and connected to the first terminal assembly member 11 and the second terminal assembly member 12. For example, if the groove 13a is formed in the ends on one side and the other side of each of the plurality of insulated heat dissipation members 13 in the second direction X as shown in FIG. 3, the groove 13a is inserted into the first protruded member 11d and the second protruded member 12d and supported by them. If the ends on one side and the other side of each of the plurality of insulated heat dissipation members 13 are flat formed in the second direction X as shown in FIG. 4, the insulated heat dissipation member 13 is disposed so that bottoms on one side and the other side thereof in the second direction X come into contact with the first protruded member 11d and the second protruded member 12d, respectively, and are supported by the first terminal assembly member 11 and the second terminal assembly member 12. The plurality of insulated heat dissipation members 13 may be supported in such a way as to be simply inserted into or laid on the first protruded members 11d and the second protruded members 12d. Alternatively, the plurality of insulated heat dissipation members 13 may be bonded to the first protruded members 11d and the second protruded members 12d using conductive epoxy in order to improve an adhesive force between the insulated heat dissipation members 13 and the first terminal assembly members 11 and the second terminal assembly members 12 or so that heat is easily transferred to the first terminal assembly member 11 and the second terminal assembly member 12 due to close adhesion. In this case, a known technology is applied to the conductive epoxy, and thus a description of the conductive epoxy is omitted.

Figure 5:
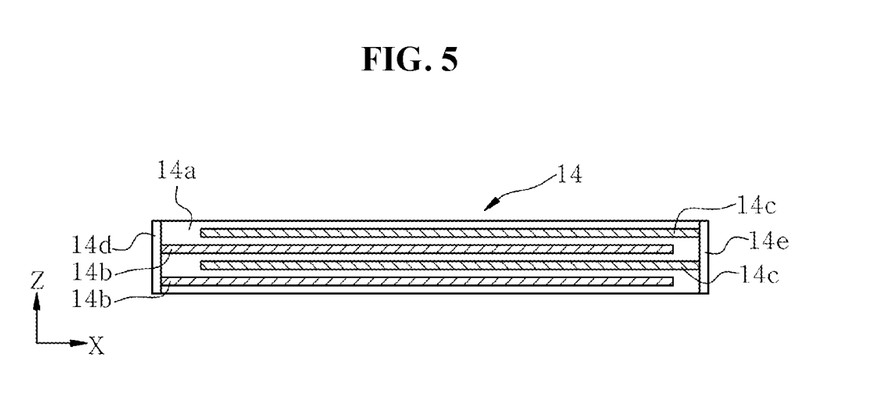
FIG. 5 is an enlarged cross-sectional view of the multi-layer ceramic capacitor shown in FIG. 3.

As shown in FIG. 5, each of the plurality of multi-layer ceramic capacitors 14 includes a sintering body 14a, a plurality of first internal electrodes 14b, a plurality of second internal electrodes 14c, a first external electrode 14d and a second external electrode 14e.

The sintering body 14a is formed by stacking a plurality of green sheets (not shown) and performing sintering. The plurality of first internal electrodes 14b is disposed within the sintering body 14a and spaced apart from each other at a specific interval. The end on one side of each first internal electrode 14b is exposed to the end on one side of the sintering body 14a in the second direction X. The plurality of second internal electrodes 14c is disposed within the sintering body 14a and alternately disposed between the plurality of first internal electrodes 14b. The end on the other side of each second internal electrode 14c is exposed to the end on the other side of the sintering body 14a in the second direction X. The first external electrode 14d is formed at the end on one side of the sintering body 14a in the second direction X so that the plurality of first internal electrodes 14b is connected, and the first external electrode 14d is connected to the first terminal assembly member 11. The second external electrode 14e is formed at the end on the other side of the sintering body 14a in the second direction X so that the plurality of second internal electrodes 14c is connected, and the second external electrode 14e is connected to the second terminal assembly member 12.

A DC-link capacitor assembly having a heat dissipation structure using the multi-layer ceramic capacitor assembly 10 configured as described above according to an embodiment of the present invention is described below.

Figure 6:
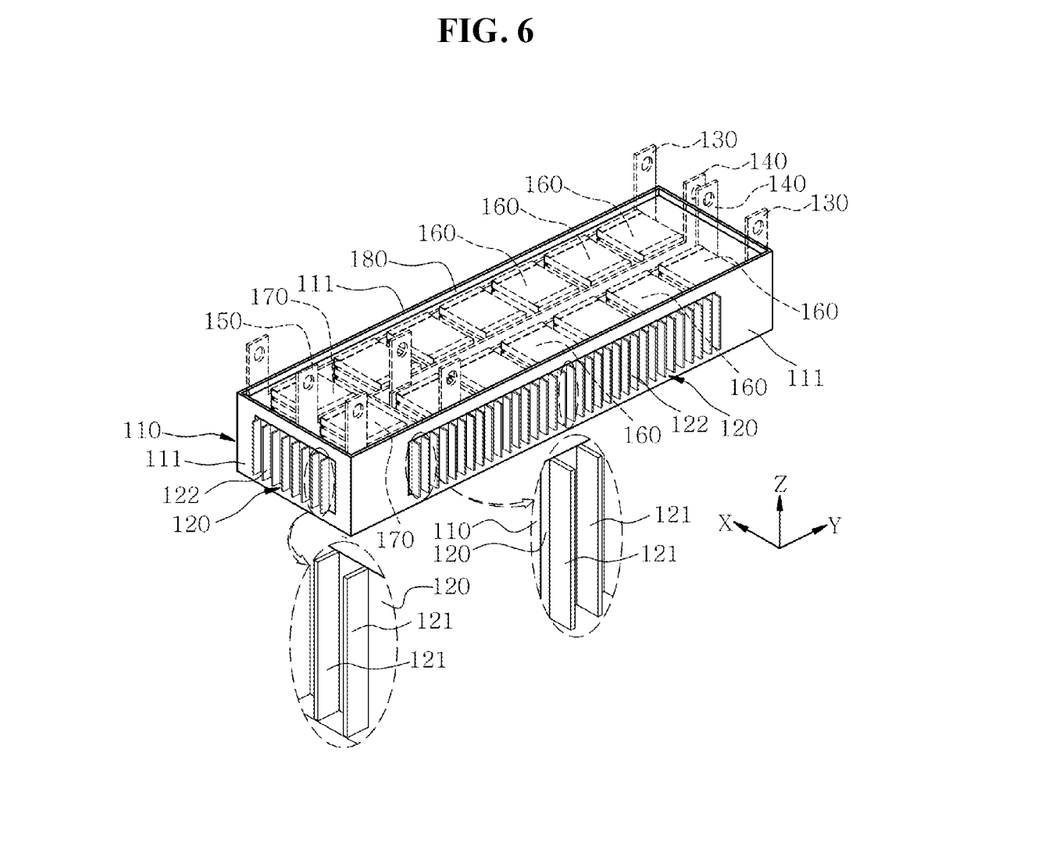
FIG. 6 is a perspective view of a DC-link capacitor assembly having a heat dissipation structure according to an embodiment of the present invention.
Figure 7:
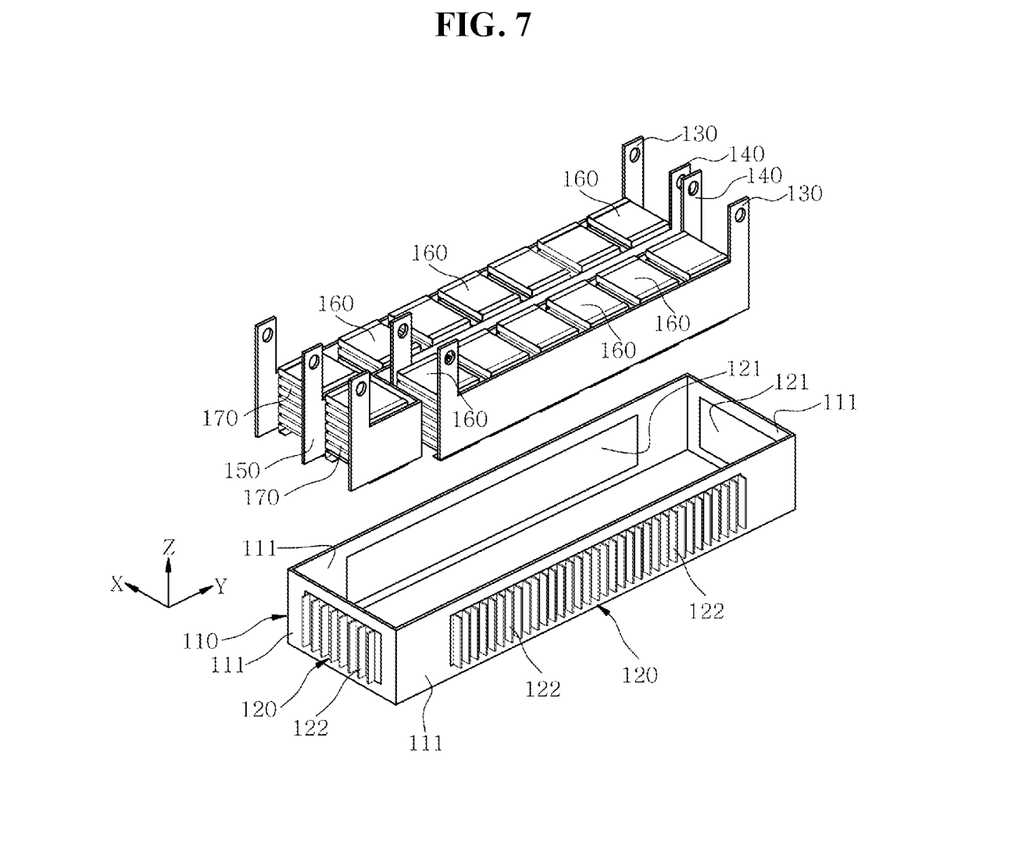
FIG. 7 is a partial exploded perspective view of the DC-link capacitor assembly shown in FIG. 6.

As shown in FIGS. 6 and 7, the DC-link capacitor assembly having a heat dissipation structure according to an embodiment of the present invention includes a casing 110, two or more metallic heat dissipation members 120, a pair of first electrode bus bars 130, a pair of second electrode bus bars 140, a third electrode bus bar 150, a plurality of DC-link capacitor assemblys 160, a pair of Y-capacitor assemblys 170 and a molding member 180.

The casing 110 is equipped with a plurality of side walls 111. An opening portion 111a (shown in FIG. 9) is formed in two or more of the plurality of side walls 111. The two or more metallic heat dissipation members 120 are disposed in the plurality of side walls 111 so that the respective opening portions 111a are clogged. The pair of first electrode bus bars 130 is disposed within the casing 110 and spaced apart from each other. The pair of first electrode bus bars 130 comes into contact with two metallic heat dissipation members 120 that belong to the two or more metallic heat dissipation members 120 and that face each other, respectively. The pair of second electrode bus bars 140 is disposed between the pair of first electrode bus bars 130, spaced apart from each other, and disposed within the casing 110. The third electrode bus bar 150 is disposed within the casing 110 so that it is spaced apart from the pair of first electrode bus bars 130 and the pair of second electrode bus bars 140. Each of the plurality of DC-link capacitor assemblys 160 is connected to one of the pair of first electrode bus bars 130 and one of the pair of second electrode bus bars 140 or connected to the other of the pair of first electrode bus bars 130 and the other of the pair of second electrode bus bars 140. Each of the pair of Y-capacitor assemblys 170 is disposed between one of the pair of first electrode bus bars 130 and the third electrode bus bar 150 and between the third electrode bus bar 150 and one of the pair of second electrode bus bars 140, and is connected to the first electrode bus bar 130, the second electrode bus bar 140 and the third electrode bus bar 150. The molding member 180 is formed so that the two or more metallic heat dissipation members 120 are exposed to the outside of the molding member 180 and the inside of the casing 110 is buried.

The configuration of the DC-link capacitor assembly having a heat dissipation structure using the multi-layer ceramic capacitor assembly 10 according to an embodiment of the present invention is described in detail below.

Figure 9:
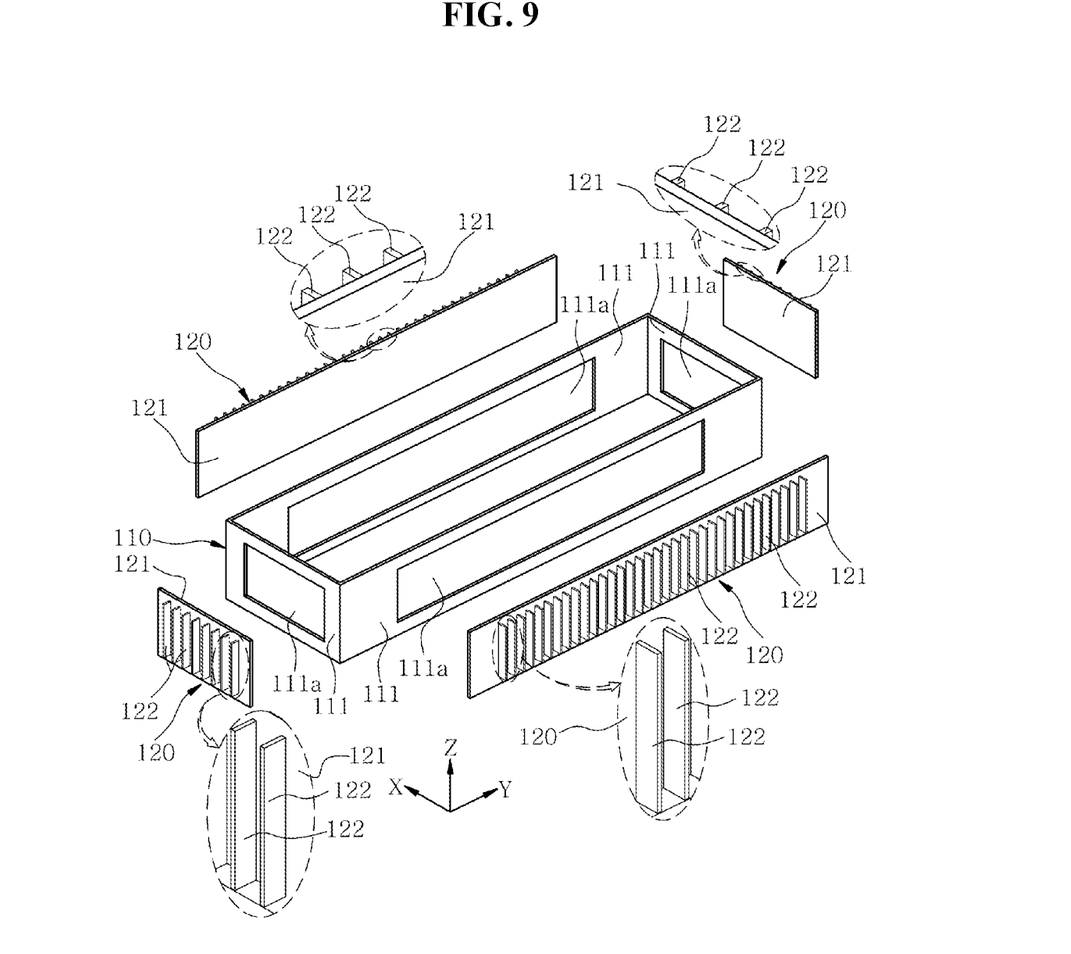
FIG. 9 is an exploded perspective view of a casing shown in FIG. 7.

As shown in FIGS. 6, 7 and 9, one side of the casing 110 in the first direction Z is open, and a quadrangle insulating casing equipped with the plurality of side walls 111 is used the casing 110.

As shown in FIGS. 6, 7 and 9, each of the two or more metallic heat dissipation members 120 includes a metal plate 121 and a plurality of heat dissipation pins 122. The metal plate 121 is disposed to clog the opening portion 111a formed in the side wall 111 and bonded to the casing 110 by insert molding. The plurality of heat dissipation pins 122 is exposed to the outside of the casing 110, spaced apart from each other at a specific interval, and integrated with the metal plate 121. In this case, the plurality of heat dissipation pins 122 is integrated with the metal plate 121 and made of the same metal material as the metal plate 121.

Figure 8:
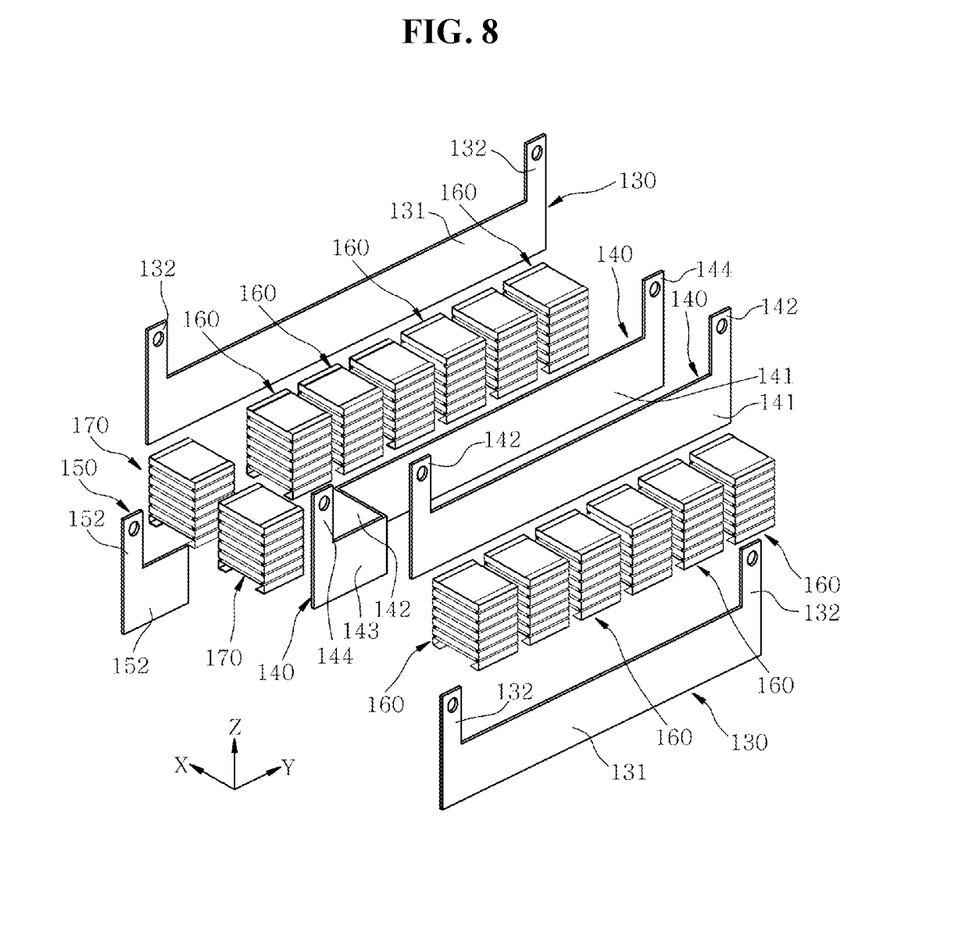
FIG. 8 is an exploded perspective view of first to third electrode bus bars shown in FIG. 7.

As shown in FIGS. 7 and 8, the pair of first electrode bus bars 130, one of the pair of second electrode bus bars 140 and the third electrode bus bar 150 of the pair of first electrode bus bars 130, the pair of second electrode bus bars 140 and the third electrode bus bar 150 include bar-shaped metal plates 131, 141 and 151 and one or more external terminal connection plates 132, 142 and 152, respectively. The bar-shaped metal plates 131, 141 and 151 are extended in a bar shape in the third direction Y orthogonal to the second direction X. The one or more external terminal connection plates 132, 142 and 152 are integrated with the respective metal plates 131, 141 and 151 and extended from them on one side or the other side of the respective metal plates 131, 141 and 151 in the third direction Y. The one or more external terminal connection plates 132, 142 and 152 are externally exposed when the casing 110 is buried by the molding member 180.

As shown in FIG. 8, the other one of the pair of second electrode bus bars 140 includes a bar-shaped metal plate 141, a first curved metal plate 142, a second curved metal plate 143 and one or more external terminal connection plates 144. The bar-shaped metal plate 141 is extended in a bar shape in the third direction Y. The first curved metal plate 142 is bent in the second direction X in such a way as to be orthogonal to the metal plate 141. The second curved metal plate 143 is bent in the third direction Y in such a way as to be orthogonal to the first curved metal plate 142. The second curved metal plate 143 of the first curved metal plate 142 and the second curved metal plate 143 is bonded and connected to one of the pair of Y-capacitor assemblys 170 by welding or conductive epoxy.

If the pair of first electrode bus bars 130 of the pair of first electrode bus bars 130 and the pair of second electrode bus bars 140 is used as respective negative electrodes, the pair of second electrode bus bars 140 is used as respective positive electrodes. In contrast, if the pair of second electrode bus bars 140 is used as respective negative electrodes, the pair of first electrode bus bars 130 is used as respective positive electrodes. In this case, the pair of first electrode bus bars 130 is bonded and connected to two metallic heat dissipation members that belong to the two or more metallic heat dissipation members 120 and that face each other by welding or conductive epoxy.

For example, one of the pair of first electrode bus bars 130 is used as a negative electrode when the first terminal assembly member 11 of the multi-layer ceramic capacitor assembly 10 used as the plurality of DC-link capacitor assemblys 160 is connected. That is, the first terminal assembly member 11 of the multi-layer ceramic capacitor assembly 10 is used as a negative electrode when the first external electrode 14d included in the plurality of multi-layer ceramic capacitors 14 is used as a negative electrode and the first external electrode 14d is connected to the first terminal assembly member 11. When the first terminal assembly member 11 used as a negative electrode is connected, one of the pair of first electrode bus bars 130 is used as a negative electrode. The other of the pair of first electrode bus bars 130 is used as a negative electrode like the one first electrode bus bar 130 because the first terminal assembly member 11 of the multi-layer ceramic capacitor assembly 10 is connected. For example, the multi-layer ceramic capacitor assembly 10 is disposed so that the first terminal assembly member 11 is connected to the pair of first electrode bus bars 130 used as negative electrodes. When the first terminal assembly member 11 is connected to the pair of first electrode bus bars 130 used as negative electrodes as described above, heat generated from the DC-link capacitor assembly 160 can be easily discharged to the outside through the metallic heat dissipation members 120 connected to the pair of first electrode bus bars 130.

The pair of second electrode bus bars 140 is used as positive electrodes when the second terminal assembly member 12 is used in the state in which the second terminal assembly member 12 of the plurality of multi-layer ceramic capacitor assemblys 10 used as the DC-link capacitor assembly 160 has been used as a positive electrode. The third electrode bus bar 150 is simultaneously bonded and connected to the first terminal assembly member 11 and the second terminal assembly member 12 included in each of the pair of multi-layer ceramic capacitor assemblys 10 used in each of the pair of Y-capacitor assemblys 170.

The multi-layer ceramic capacitor assembly 10 according to an embodiment of the present invention is used as each of the plurality of DC-link capacitor assemblys 160. The multi-layer ceramic capacitor assembly 10 is connected to one of the pair of first electrode bus bars 130 by welding or conductive epoxy. The multi-layer ceramic capacitor assembly 10 shown in FIGS. 1 and 2 includes the first terminal assembly member 11, the second terminal assembly member 12, the plurality of insulated heat dissipation members 13 and the plurality of multi-layer ceramic capacitors 14. In this case, the sintering body 14a of the multi-layer ceramic capacitor 14 applied to the DC-link capacitor assembly 160 is made of a dielectric material having a dielectric constant of 5 to 800. For example, one of $MgTiO_3$, $CaTiO_3$ and $BaTiO_3$—$CaTiO_3$ mixtures is used as the dielectric material of the sintering body 14a if the multi-layer ceramic capacitor assembly is used as the DC-link capacitor assembly. The dielectric material of the sintering body 14a is not limited to the aforementioned mixtures. For example, various types of dielectric materials having a dielectric constant of 5 to 800 may be used as the dielectric material of the sintering body 14a.

The multi-layer ceramic capacitor assembly 10 according to an embodiment of the present invention is used as each of the pair of Y-capacitor assemblys 170. The multi-layer ceramic capacitor assembly 10 is connected to one of the pair of first electrode bus bars 130 or one of the third electrode bus bars 150 by welding or conductive epoxy. The multi-layer ceramic capacitor assembly 10 shown in FIGS. 1 and 2 includes the first terminal assembly member 11, the second terminal assembly member 12, the plurality of insulated heat dissipation members 13 and the plurality of multi-layer ceramic capacitors 14. In this case, the dielectric material having a dielectric constant of 1000 to 20000 is used as the sintering body 14a of the multi-layer ceramic capacitor 14 applied to the pair of Y-capacitor assemblys 170. For example, one of $BaTiO_3$, $(BaCa)(ZrTi)O_3$, $Pb(ZrTi)O_3$, $(PbCa)(ZrTi)O_3$ and $(PbLa)(ZrTi)O_3$ is used as the dielectric material of the sintering body 14a if the multi-layer ceramic capacitor assembly 10 is used as each of the pair of Y-capacitor assemblys 170. The dielectric material of the sintering body 14a is not limited to the aforementioned materials. For example, various types of dielectric materials having a dielectric constant of 1000 to 20000 may be used as the dielectric material of the sintering body 14a.

An operation of the DC-link capacitor assembly having a heat dissipation structure using the multi-layer ceramic capacitor assembly 10 according to an embodiment of the present invention is schematically described below.

The pair of first electrode bus bars 130 is disposed within the casing 110, and they are bonded and connected to the two metallic heat dissipation members 120 in a surface-to-surface manner by welding or conductive epoxy, which are disposed to face each other in the second direction X. In this case, laser welding is used as the welding. A known technology is applied to the conductive epoxy, and thus a description thereof is omitted. The first terminal assembly member 11 of the multi-layer ceramic capacitor assembly 10 used as each of the plurality of DC-link capacitor assemblys 160 is connected to the pair of first electrode bus bars 130 bonded to the metallic heat dissipation member 120. That is, when the metallic heat dissipation member 120 is bonded and connected to a surface on one side of each of the pair of first electrode bus bars 130, the first terminal assembly member 11 of the multi-layer ceramic capacitor assembly 10 is connected to a surface on the other side of each of the pair of first electrode bus bars 130. The first terminal assembly member 11 is bonded and connected to the first electrode bus bar 130 by welding or conductive epoxy.

When the first terminal assembly member 11 of the multi-layer ceramic capacitor assembly 10 used as the DC-link capacitor assembly 160 is connected to the pair of first electrode bus bars 130, the second terminal assembly member 12 of the multi-layer ceramic capacitor assembly 10 is bonded and connected to the pair of second electrode bus bars 140 by welding or conductive epoxy. If the first terminal assembly member 11 of the multi-layer ceramic capacitor assembly 10 is used as a negative electrode and the second terminal assembly member 12 is used as a positive electrode, the pair of first electrode bus bars 130 is used as a negative electrode and the pair of second electrode bus bars 140 is used as positive electrodes. That is, the multi-layer ceramic capacitor assemblys 10 used as the DC-link capacitor assemblys 160 are connected in parallel by the pair of first electrode bus bars 130 and the pair of second electrode bus bars 140. In this case, the multi-layer ceramic capacitor assemblys 10 used as the DC-link capacitor assemblys 160 are bonded and connected by welding or conductive epoxy so that the plurality of multi-layer ceramic capacitors 14 is connected to the first terminal assembly member 11 and the second terminal assembly member 12 in parallel.

As described above, the multi-layer ceramic capacitor assembly 10 used as the DC-link capacitor assembly 160 can easily discharge heat, generated from the plurality of multi-layer ceramic capacitors 14, to the outside through the insulating heat dissipation members 13 alternately disposed between the plurality of multi-layer ceramic capacitors 14, the first terminal assembly member 11, the pair of first electrode bus bars 130 and the conductive heat dissipation member 120. Accordingly, the deterioration of reliability of electrical characteristics attributable to heat can be prevented. If the first terminal assembly member 11 is used as a negative electrode and the second terminal assembly member 12 is used as a positive electrode, the first terminal assembly member 11 of one of the pair of multi-layer ceramic capacitor assemblys 10 each used as the Y-capacitor assembly 170 is connected to one of the pair of first electrode bus bars 130 by welding or conductive epoxy, thereby being capable of easily discharging heat to the outside.

The pair of second electrode bus bars 140 is used as positive electrodes when the second terminal assembly member 12 of the plurality of multi-layer ceramic capacitor assemblys 10 used as the DC-link capacitor assembly 160 is connected in the state in which the second terminal assembly member 12 has been used as a positive electrode. One of the pair of second electrode bus bars 140 is bonded and connected to the second terminal assembly member 12 of one of the pair of multi-layer ceramic capacitor assemblys 10 used as the Y-capacitor assembly 170 by welding or conductive epoxy. The third electrode bus bar 150 is simultaneously bonded and connected to the first terminal assembly member 11 and the second terminal assembly member 12 respectively included in the pair of multi-layer ceramic capacitor assemblys 10 respectively used in the pair of Y-capacitor assemblys 170, thus operating as a known DC-link capacitor circuit.

The multi-layer ceramic capacitor assembly according to an embodiment of the present invention is applied to manufacturing industry fields for an electric vehicle, a hybrid vehicle (e.g., a vehicle to which an electric driving source is applied), a hydrogen fuel vehicle and/or a power transmission system.

As described above, the multi-layer ceramic capacitor assembly according to an embodiment of the present invention has advantages in that it can reduce a size because it uses the multi-layer ceramic capacitor having an excellent temperature characteristic and capacity per unit volume and can have an excellent heat dissipation characteristic by alternately inserting the heat dissipation members between the plurality of multi-layer ceramic capacitors when the plurality of multi-layer ceramic capacitors is assembled into a single assembly and inserting the heat dissipation member between the multi-layer ceramic capacitor and the casing.

What is claimed is:

1. A multi-layer ceramic capacitor assembly, comprising:
   a first terminal assembly member formed by arranging a plurality of first protruded members at specific intervals,
   the first terminal assembly member comprising a first vertical plate in which each of the plurality of first protruded members is spaced apart from each other at specific intervals in a first direction, a first lower plate extended from an end on one side of the first vertical plate in a second direction orthogonal to the first direction, and a first upper plate extended from an end on the other side of the first vertical plate in a same direction as the first lower plate,
   each of the first vertical plate, the first lower plate, and the first upper plate being made of a metal material, and
   each of the plurality of first protruded members being formed by bending the first vertical plate at specific intervals so that the first vertical plate is partially protruded in the second direction;
   a second terminal assembly member formed by arranging a plurality of second protruded members at specific intervals in such a way as to face the respective first protruded members,
   the second terminal assembly member comprising a second vertical plate in which each of the plurality of second protruded members is spaced apart from each other at specific intervals in the first direction, a second lower plate extended from an end on one side of the second vertical plate in the second direction orthogonal to the first direction, and an second upper plate extended from an end on the other side of the second vertical plate in the same direction as the second lower plate,
   each of the second vertical plate, the second lower plate, and the second upper plate being made of a metal material, and
   each of the plurality of second protruded members being formed by bending the second vertical plate at specific intervals so that the second vertical plate is partially protruded in the second direction;
   a plurality of insulated heat dissipation members supported by the first protruded members and the second protruded members and disposed therein, respectively,
   a ceramic plate being used as each of the plurality of insulated heat dissipation members, and
   ends on one side and the other side of each of the insulated heat dissipation members in the second direction being flat, or
   grooves being respectively formed in the ends on one side and the other side of each of the insulated heat dissipation members, supported and combined with the first protruded members and the second protruded members and connected to the first terminal assembly member and the second terminal assembly member, respectively; and
   a plurality of multi-layer ceramic capacitors alternately disposed between the plurality of insulated heat dissipation members so that each of the multi-layer ceramic capacitors comes into contact with one side and the other side of each of the insulated heat dissipation members in the first direction, an end on one side of the multi-layer ceramic capacitor in the second direction orthogonal to the first direction is connected to the first terminal assembly member, and an end on the other side of the multi-layer ceramic capacitor in the second direction is connected to the second terminal assembly member,
   wherein the first direction is indicative of a thickness direction of the multi-layer ceramic capacitor.

2. The multi-layer ceramic capacitor assembly of claim 1, wherein grooves are respectively formed in the ends on one side and the other side of each of the insulated heat dissipation members, supported and combined with the first protruded members and the second protruded members and connected to the first terminal assembly member and the second terminal assembly member, respectively.

3. The multi-layer ceramic capacitor assembly of claim 1, wherein each of the plurality of multi-layer ceramic capacitors comprises:
   a sintering body;
   a plurality of first internal electrodes disposed within the sintering body and spaced apart from each other at a specific interval, an end on one side of each of the plurality of first internal electrodes being exposed to an end on one side of the sintering body in the second direction;
   a plurality of second internal electrodes alternately disposed between the plurality of first internal electrodes within the sintering body, an end on the other side of each of the plurality of second internal electrodes being exposed to an end on the other side of the sintering body in the second direction;
   a first external electrode formed at the end on one side of the sintering body in the second direction so that the plurality of first internal electrodes is connected and connected to the first terminal assembly member; and
   a second external electrode formed at the end on the other side of the sintering body in the second direction so that the plurality of second internal electrodes is connected and connected to the second terminal assembly member.

* * * * *